(12) United States Patent
Naidu et al.

(10) Patent No.: US 7,721,759 B2
(45) Date of Patent: May 25, 2010

(54) VALVE HAVING A PROTECTIVE CAGE

(75) Inventors: Vishnu R. Naidu, Windermere, FL (US); Joseph R. Russo, Jr., Orlando, FL (US)

(73) Assignee: Chep Technology Pty Limited, Sydney (AU)

( * ) Notice: Subject to any disclaimer, the term of this patent is extended or adjusted under 35 U.S.C. 154(b) by 736 days.

(21) Appl. No.: 11/220,474

(22) Filed: Sep. 7, 2005

(65) Prior Publication Data

US 2007/0053617 A1   Mar. 8, 2007

(51) Int. Cl.
B65D 90/20 (2006.01)
(52) U.S. Cl. .................. 137/590; 222/105; 220/495.05
(58) Field of Classification Search ................. 251/144; 137/590; 222/189.06, 189.07, 189.08, 189.09, 222/189.1, 189.11, 105, 106, 107, 464.1, 222/464.2, 386.5; 220/495.03, 495.05
See application file for complete search history.

(56) References Cited

U.S. PATENT DOCUMENTS

| | | | | |
|---|---|---|---|---|
| 3,257,036 A | * | 6/1966 | Micallef | 222/95 |
| 3,420,413 A | * | 1/1969 | Corsette | 222/107 |
| 3,453,033 A | * | 7/1969 | Goss | 312/35 |
| 3,674,179 A | * | 7/1972 | Galloway | 222/94 |
| 3,904,173 A | | 9/1975 | Naylor | 241/306 |
| 4,181,243 A | * | 1/1980 | Frahm | 222/189.06 |
| 4,193,518 A | * | 3/1980 | Holmes | 222/105 |
| 4,331,266 A | * | 5/1982 | Bond | 222/107 |
| 4,375,864 A | * | 3/1983 | Savage | 222/81 |
| 5,115,837 A | * | 5/1992 | Tupper | 137/625.41 |
| 5,556,005 A | * | 9/1996 | Banks | 222/96 |
| 5,566,851 A | * | 10/1996 | Sasaki et al. | 229/117.27 |
| 5,628,430 A | * | 5/1997 | Barbe | 222/132 |
| 5,730,328 A | * | 3/1998 | Maeder et al. | 222/95 |
| 6,073,804 A | * | 6/2000 | Yquel | 222/95 |
| 6,214,217 B1 | | 4/2001 | Sliger, Jr. | 210/169 |
| 6,228,011 B1 | * | 5/2001 | Takemura et al. | 493/87 |
| 6,390,331 B2 | * | 5/2002 | Schutz | 222/105 |
| 6,484,746 B2 | * | 11/2002 | Tine, Jr. | 137/351 |
| 2001/0023711 A1 | * | 9/2001 | Gnudi | 137/590 |
| 2002/0166864 A1 | | 11/2002 | Stillinger et al. | 220/714 |
| 2003/0102335 A1 | * | 6/2003 | Barnett | 222/386.5 |
| 2004/0011830 A1 | * | 1/2004 | Kim | 222/559 |
| 2006/0163290 A1 | * | 7/2006 | Ehret | 222/386.5 |
| 2006/0163292 A1 | * | 7/2006 | Wauters et al. | 222/464.2 |
| 2007/0119875 A1 | * | 5/2007 | Ehret et al. | 222/386.5 |

* cited by examiner

*Primary Examiner*—John Fox
(74) *Attorney, Agent, or Firm*—Allen, Dyer, Doppelt, Milbrath & Gilchrist, P.A.

(57) ABSTRACT

A valve for a liner bag includes a valve seat having an opening extending therethrough to be aligned with an opening in the liner bag, and a flange extends outwardly from the valve seat and is to be placed inside the liner bag so that the valve seat projects outside the liner bag. A valve member is within the opening of the valve seat for controlling egress of liquids or flowable solids from the liner bag. An operating lever is outside the liner bag for operating the valve member. A fixed protective cage is coupled to the flange for protecting the opening of the valve seat from inside the liner bag when the liner bag collapses.

12 Claims, 2 Drawing Sheets

VALVE HAVING A PROTECTIVE CAGE

FIELD OF THE INVENTION

The present invention is directed to valves and particularly to valves that are suitable for use in flexible bags, such as those used as liner bags in rigid containers.

BACKGROUND OF THE INVENTION

Intermediate Bulk Containers (IBCs) are large size containers that may be used for storing and transporting a number of different items. Typically, an IBC is a generally cubic container having a base, fixed or foldable side walls and a top. When IBCs are used for the transport of liquid products, a liner bag is utilized within the container to hold the liquid. A liner bag may also be used for transporting flowable powdered or granulated solids. The liner bag contains an inlet for filling the bag, which may be placed at the top of the liner bag, and an outlet for emptying the bag. The outlet may be a simple gland, with no moving parts, or may include a valve. The valve may be closable during emptying so that complete emptying of the IBC does not need to take place at once, and may be re-opened at a later time to continue the emptying process.

The gland that is traditionally used with IBCs includes a membrane which prevents premature discharging of the liner bag when the cap of the outlet is opened. The membrane is pierced with a cutter pusher, which is a generally cylindrical tool having a serrated edge that can pierce the membrane. The cutter pusher helps to prevent the liner bag from being sucked into the outlet, however the liner bag may become snagged on the serrated edge, potentially causing a leak in the bag.

Current valves used in IBC liner bags are susceptible to blockage during emptying, because the liner bag wall becomes drawn into the valve as a result of a drop in pressure within the bag as the contents are discharged. When the valve becomes blocked in this way by the liner wall that is sucked into it, the blockage must be manually cleared for discharging of the liner bag to continue. This results in equipment downtime and, potentially, contamination of the liner bag contents. Contamination (or potential contamination) is a major problem when a container such as an IBC is used to transport liquids designed for human or animal consumption as typically the entire contents of the container must be destroyed due to the risk of contamination if the liner bag is breached. The valves in current use in IBC liner bags are also expensive, and their use is not widespread due to the costs for a single-use application.

It would be beneficial to provide a valve which has protection against the liner bag becoming entangled in the valve. It would also be beneficial for the valve to be low-cost and simple to manufacture and operate.

The present invention is directed to alleviating one or more of the aforementioned problems, and meeting one or more of the above-identified needs.

SUMMARY OF THE INVENTION

One aspect of the present invention relates to a valve that may be used with a flexible bag, and a liner bag including a valve. The valve includes a valve member located in a valve seat and having a valve opening for egress of liquids from the bag. An operating lever is positioned outside the bag. A protective cage extends in front of the valve opening, the cage being positioned inside the bag to prevent the wall of the bag from collapsing into the valve opening during emptying of liquids from the bag. This arrangement prevents the bag wall from clogging the valve during discharge of the bag's contents.

In a preferred arrangement, the protective cage may extend from the valve into the interior of the container in use. The protective cage may include a top and sides having openings, with the area of the openings in the sides being equal to, or greater than, the area of the valve opening. Each opening in the sides of the cages preferably has a width dimension that is between about 50% and about 70% of the diameter of the valve opening. A width dimension of the openings in the top are preferably between about 50% and about 70% of the diameter of the valve opening.

In one arrangement, protective cage comprises a plurality of legs extending outwardly from the valve seat, the legs supporting a permeable face plate. The permeable face plate may be an open grid.

A flange may extend around the valve seat, the flange designed to retain the valve in a wall of a container. A cap may be attached to the valve seat to protect the valve member prior to use. The valve may be formed of plastic material.

Another aspect of the present invention relates to a liner bag for a container, which includes at least one wall, forming a container for liquids or flowable solids. An outlet is provided in the wall. A valve is located in the outlet, including a valve member located in a valve seat and having a valve opening for egress of liquids from the liner bag. An operating lever to operate the valve member is included, the operating lever being positioned outside the liner bag. A protective cage is located around the valve opening, the cage being positioned inside the liner bag to prevent the wall of the liner bag from collapsing into the valve opening.

The cage is preferably open on five sides so that if one or more sides becomes blocked by the bag wall, liquid can still pass into the valve through the open sides. In addition, the bag wall cannot be sucked into the valve, thus preventing the bag from tearing. The valve and liner bag including the valve thus can be safely used for the transport of liquids, without the risk of clogging or bag rupture. Additionally, the design of the valve allows for a low manufacturing cost.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

The present invention is more particularly described in the following description that is intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the terms "including", "consisting of" and "consisting essentially of".

The present invention provides a valve that may be used in a liner bag when used in a rigid container to transport liquids or flowable powdered or granulated solids. However, the invention is not limited in this regard, and is applicable to other containers having flexible walls that may be employed separately from any rigid container. Additionally, although the invention is illustrated and described using an example of an Intermediate Bulk Container (IBO), it is applicable to any other container having a liner bag, such as, for example, a large standard cargo container, or a wine or other beverage or food box having a bag-in-box arrangement.

Figure 1:
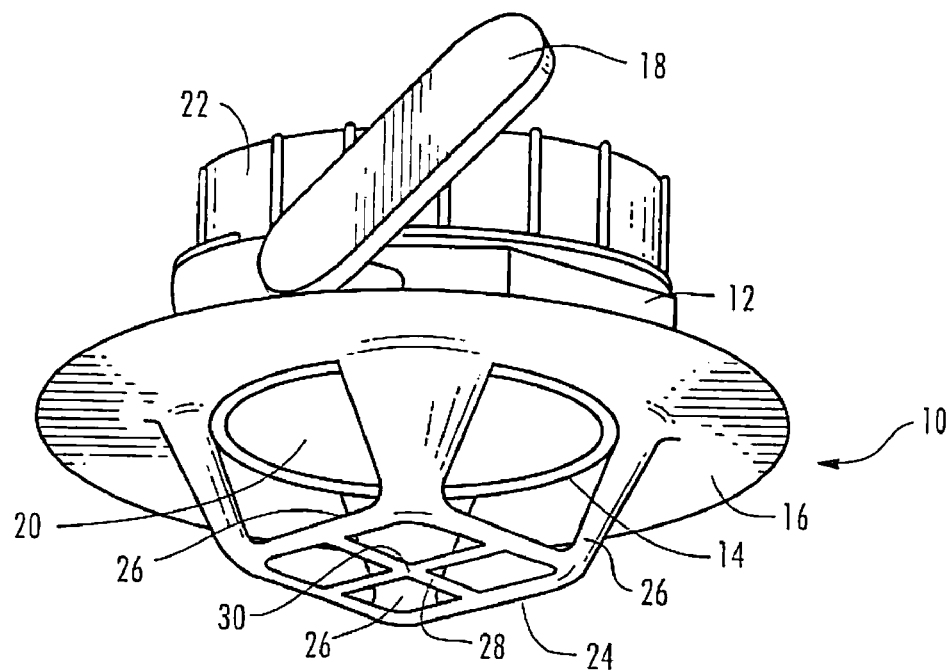
FIG. 1 is a perspective view of a valve according to one embodiment of the present invention.
Figure 2:
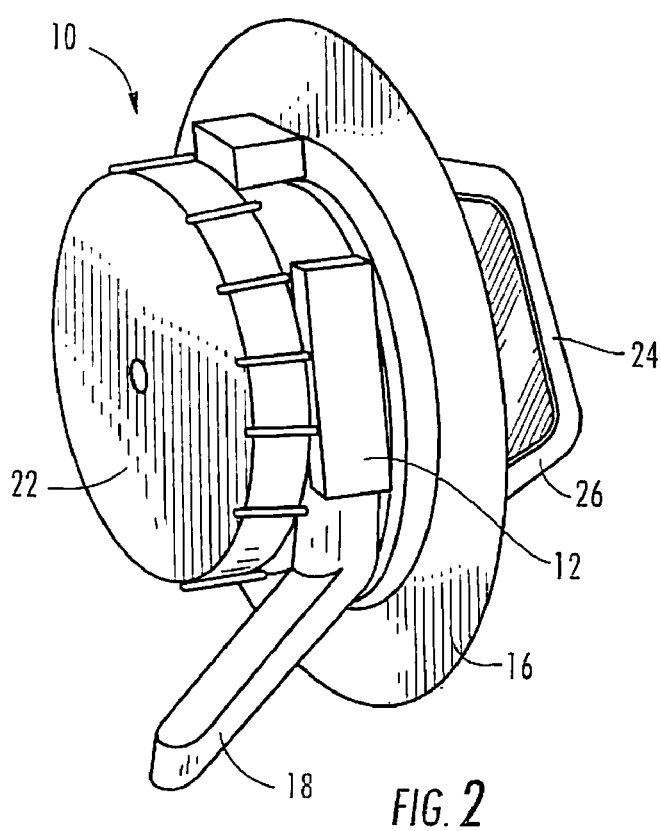
FIG. 2 is an alternative perspective view of the valve shown in FIG. 1.

Referring to FIGS. 1 and 2, a valve 10 in accordance with the inventive arrangements comprises a valve seat 12 having a generally cylindrical valve opening 14 therethrough. A flange 16 extends from the valve seat 12 at an end thereof. An operating lever 18 extends from and through a side of the valve seat 12, and controls operation of a butterfly valve member 20 located in the valve opening. It will be appreciated that any suitable valve member 20 such as a flap valve or a ball valve or any other valve member may be used, and the invention is not limited to the use of a butterfly valve. A cap 22 may be screw-threadingly engaged with the valve seat 12 at an end thereof opposite to the end having the flange 16.

A protective cage 24 extends from the valve seat 12, and may include legs 26 supporting a grid 28. The illustrated grid 28 is generally square, and there are thus four legs 26, one supporting each corner of the grid. It will be appreciated that the grid 28 may be any suitable shape, such as circular, rectangular, triangular, or polygonal, and that the number of legs 24 may vary accordingly. Alternatively, the sides of the cage 24 may be formed of additional grids, or apertured plates. As a further alternative, the cage 24 may be in the form of a dome, hemisphere or have any other suitable curved shape. The illustrated grid 28 includes a central cross piece 30 that forms four open squares in the grid. Any suitable number and shape of openings may be employed, and the grid may be in the form of an apertured plate. The cage is preferably open on five sides so that if one or more sides becomes blocked by the bag wall, liquid can still pass into the valve through the open sides. The liner bag wall cannot be sucked into the valve because it is blocked by the cage, thus preventing the bag from tearing.

In a preferred embodiment, the area of the openings in the sides of the cage 24 formed between the legs 26 should be equal to, or greater than, the area of the valve opening. This allows for the volumetric flow rate through the sides of the grid to be equal to, or greater than, the volumetric flow rate through the valve itself. Such an arrangement ensures that the flow of liquid through the valve is not compromised when the liner bag material is against the grid 26, blocking flow through the grid to the valve. In another preferred arrangement, each opening in the sides of the cage 24 has an area that is between about 50% and about 70% of the area of the valve opening. In another preferred embodiment, the area of the openings in the grid 28 is between about 50% and about 70% of the area of the valve opening. For example, for a 3" valve, which has a nominal diameter of 75 mm, the grid openings may be between 37 mm and 52 mm. The 3" valve has a nominal valve opening area of 4418 $mm^2$ and therefore the four side openings may have a combined area of not less than 4418 $mm^2$.

The valve may be formed of any suitable material. Preferably a plastic material is used. The entire valve may be formed of the same material, or different parts of the valve may be formed of different materials. The material of the protective cage 24 should be strong enough to withstand the pressure of the liner bag being sucked onto the cage by the pressure reduction caused by discharge of the liner bag contents through the valve. In one arrangement, the cage 24 may be formed of metal. In another arrangement, the cage 34 may be formed of polyethylene, polypropylene, or from any number of injection molding resins.

Figure 3:
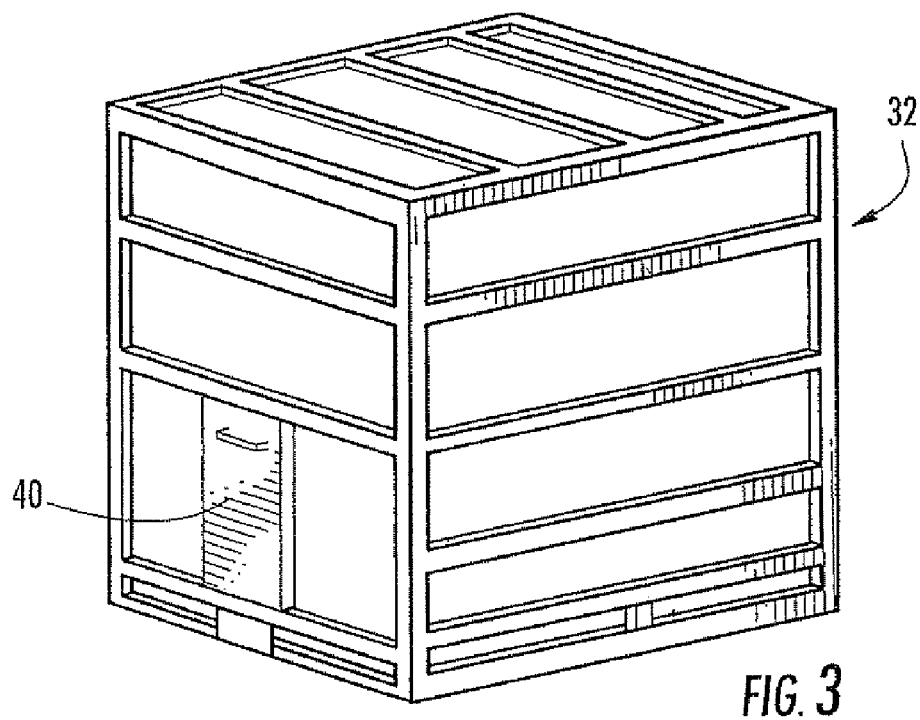
FIG. 3 is a perspective view of a container.
Figure 4:
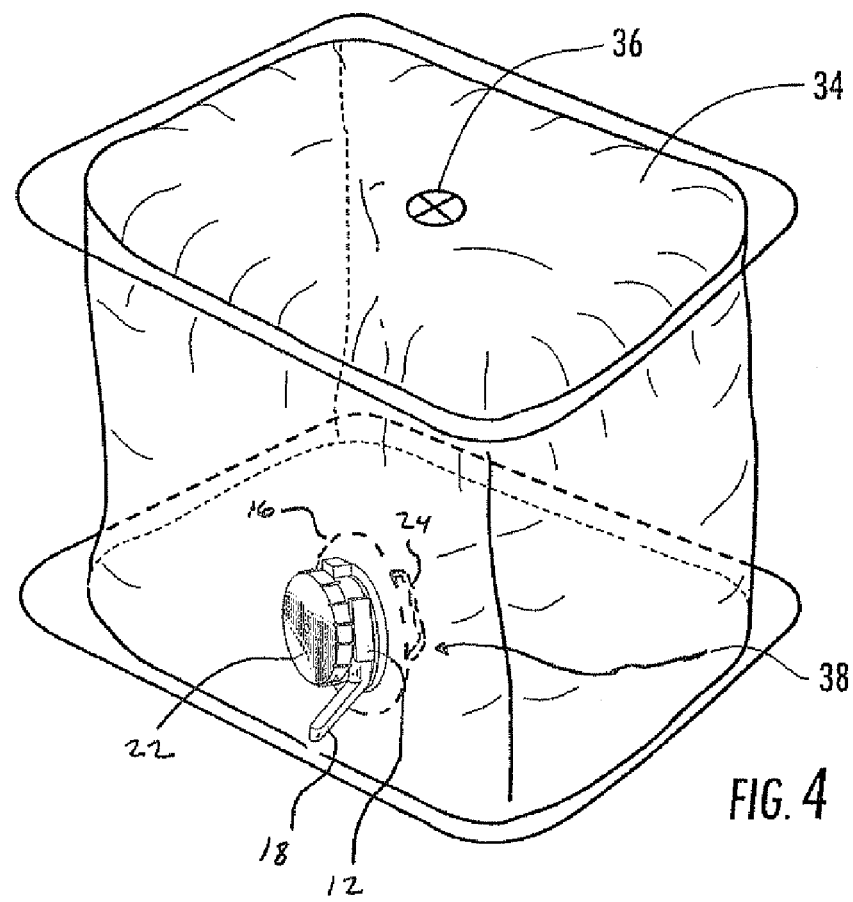
FIG. 4 is a perspective view of a liner bag for use with the container of FIG. 3.

Referring now to FIGS. 3 and 4, a rigid container 32 is shown, which in the illustrated example is an Intermediate Bulk Container (IBC) but may be any other suitable rigid container. A liner bag 34 for a rigid container is also shown, having the liner bag inlet 36 and outlet 38. In some arrangements, only one aperture may be provided, which can function as both the inlet and outlet of the liner bag. The valve 10 of the inventive arrangements is installed into the outlet 38 of the liner bag. The flange 16 is placed inside the liner bag 34 so that it prevents removal of the valve 10 from the bag. The protective cage 24 extends into the interior of the liner bag 34, and the operating lever 18 is located on the outside of the liner bag 34. The liner bag 34 is placed within an IBC 32, and filled with liquid via the inlet 36. The inlet 36 is then sealed. To empty the contents of the liner bag, a flap 40 on the IBC 32 is opened to gain access to the valve 10. The protective cap 22 is removed from the valve 10, and the operating lever 18 is used to open the valve member 20. The contents of the liner bag 34 are then allowed to exit the bag. As the liner bag 34 empties, the material of the liner bag has a tendency to approach the valve along with the exiting liquid, however the protective cage 24 keeps the material of the liner bag from blocking the valve 10. This arrangement ensures continuous flow of liquid through the valve until the liner bag 34 is empty, and preventing contamination of the contents of the liner bag.

Although the illustrative embodiments of the present disclosure have been described herein with reference to the accompanying drawings and embodiments, it is to be understood that the disclosure is not limited to those precise embodiments, and various other changes and modifications may be affected therein by one skilled in the art without departing from the scope of spirit of the disclosure. All such changes and modifications are intended to be included within the scope of the disclosure as defined by the appended claims.

The invention claimed is:

1. An intermediate bulk container (IBC) for transporting liquids or flowable solids and comprising:
   a non-pressurized container;
   a liner bag carried by the non-pressurized container and having an inlet for receiving the liquids or flowable solids, and an outlet; and
   a valve carried by the outlet of the liner bag for dispensing the liquids or flowable solids therefrom, and comprising
      a valve seat having an opening extending therethrough to be aligned with the outlet in the liner bag;
      a flange extending outwardly from the valve seat and to be placed inside the liner bag so that the valve seat projects outside the liner bag;
      a valve member within the opening of the valve seat for controlling egress of liquids or flowable solids from the liner bag;
      an operating lever outside the liner bag for operating the valve member; and
      a fixed protective cage coupled directly to the flange for protecting the opening of the valve seat from inside the liner bag when the liner bag collapses, the fixed protective cage comprising
         a plurality of legs extending outwardly from the flange, and
         a permeable face plate supported by the plurality of legs, with the permeable face plate being configured as an open grid.

2. The IBC according to claim 1, wherein the plurality of legs are spaced apart so that there is an opening between adjacent legs, and an area of the openings is equal to, or greater than, an area of the valve opening.

3. The IBC according to claim 2, wherein the valve opening is cylindrically shaped, and wherein each opening between adjacent legs has a width within a range of about 50% to 70% of a diameter of the cylindrically shaped valve opening.

4. The IBC according to claim 1, wherein the valve opening is cylindrically shaped, and wherein the open grid of the permeable face plate includes a plurality of openings therethrough, and a width of the plurality of openings is within a range of about 50% to 70% of a diameter of the cylindrically shaped valve opening.

5. The IBC according to claim 1, further comprising a removable cap attached to the valve seat to protect the valve member prior to use.

6. The IBC according to claim 1, wherein the valve seat, the flange, the valve member and the fixed protective cage comprises plastic.

7. An intermediate bulk container (IBC) for transporting liquids or flowable solids and comprising:
   a container having a base, a top and a pair of opposing sidewalls therebetween for defining a generally cubic shape, the container being non-pressurized and comprising a movable flap carried by one of the sidewalls;
   a flexible liner bag carried by the container and having an inlet for receiving the liquids or flowable solids to be transported, and an outlet aligned with the movable flap; and
   a valve carried by the outlet of the liner bag for dispensing the liquids or flowable solids therefrom, and comprising
      a valve seat having an opening extending therethrough aligned with the outlet in the liner bag,
      a flange extending outwardly front the valve seat and placed inside the liner bag so that the valve seat projects outside the liner bag,
      a valve member within the opening of the valve seat for controlling egress of the liquids or flowable solids from the output of the liner bag,
      an operating lever outside the liner bag for operating the valve member, and
      a fixed protective cage coupled directly to the flange for protecting the opening of the valve seat from inside the liner bag when the liner bag collapses, the fixed protective cage comprising
         a plurality of legs extending outwardly from the flange, and
         a permeable face plate supported by the plurality of legs, with the permeable face plate being configured as an open grid.

8. The IBC according to claim 7, wherein the plurality of legs are spaced apart so that there is an opening between adjacent legs, and an area of the openings is equal to, or greater than, an area of the valve opening.

9. The IBC according to claim 8, wherein the valve opening is cylindrically shaped, and wherein each opening between adjacent legs has a width within a range of about 50% to 70% of a diameter of the cylindrically shaped valve opening.

10. The IBC according to claim 7, wherein the valve opening is cylindrically shaped, and wherein the open grid of the permeable face plate includes a plurality of openings therethrough, and a width of the plurality of openings is within a range of about 50% to 70% of a diameter of the cylindrically shaped valve opening.

11. The IBC according to claim 7, further comprising a removable cap attached to the valve seat to protect the valve member prior to use.

12. The IBC according to claim 7, wherein the valve seat, the flange, the valve member and the fixed protective cage comprises plastic.

* * * * *

UNITED STATES PATENT AND TRADEMARK OFFICE
CERTIFICATE OF CORRECTION

| | | |
|---|---|---|
| PATENT NO. | : 7,721,759 B2 | Page 1 of 1 |
| APPLICATION NO. | : 11/220474 | |
| DATED | : May 25, 2010 | |
| INVENTOR(S) | : Naidu et al. | |

It is certified that error appears in the above-identified patent and that said Letters Patent is hereby corrected as shown below:

Column 3, Line 8

Delete: "(IBO)"
Insert: -- (IBC) --

Column 5, Line 33

Delete: "front the"
Insert: -- from the --

Signed and Sealed this

Seventh Day of December, 2010

David J. Kappos
*Director of the United States Patent and Trademark Office*